US006226879B1

(12) United States Patent
Baird

(10) Patent No.: US 6,226,879 B1
(45) Date of Patent: May 8, 2001

(54) METHOD OF AND MEANS FOR ESTABLISHING VEHICLE DATUM

(75) Inventor: Billy Carr Baird, Sturgis, KY (US)

(73) Assignee: Saturn Machine & Welding Co., Inc., Sturgis, KY (US)

( * ) Notice: Subject to any disclaimer, the term of this patent is extended or adjusted under 35 U.S.C. 154(b) by 0 days.

(21) Appl. No.: 09/299,185

(22) Filed: Apr. 23, 1999

(51) Int. Cl.[7] ........................ G01B 5/24

(52) U.S. Cl. ........................ 33/203.18; 33/DIG. 21; 33/286

(58) Field of Search ........................ 33/203, 203.18, 33/203.19, 203.2, 281, 283, 288, 370, 371, 373, 391, 395, 600, DIG. 21

(56) References Cited

U.S. PATENT DOCUMENTS 2,177,669 * 10/1939 Martin .............................. 33/203.18
3,199,208 8/1965 Hunter .............................. 33/203.18
3,337,961 8/1967 Holub .............................. 33/203.18
3,488,023 1/1970 Shooter et al. .............................. 33/203.18
3,576,372 * 4/1971 Baker .............................. 33/288
3,707,772 * 1/1973 Cotter .............................. 33/395
3,953,134 4/1976 Appel et al. .............................. 33/203.18
3,956,830 * 5/1976 MacMillan .............................. 33/203.18
4,115,926 9/1978 Hampton, Jr. et al. .............................. 33/288
4,135,823 1/1979 Hörvallius .............................. 33/203.18
4,303,338 12/1981 Morrison et al. .............................. 33/203.18
4,440,495 4/1984 Bergström et al. .............................. 33/288
4,466,196 8/1984 Woodruff .............................. 33/288
4,771,546 * 9/1988 Cavzos .............................. 33/203.18
4,827,623 5/1989 Goodell .............................. 33/288
4,854,702 8/1989 Stieff .............................. 33/288
4,863,267 9/1989 Bendickson et al. .............................. 33/288
5,168,632 12/1992 Rimlinger, Jr. .............................. 33/203.18
5,537,205 * 7/1996 Costa et al. .............................. 33/DIG. 21
5,666,736 * 9/1997 Wen .............................. 33/391
5,886,782 3/1999 Hedgecock, Jr. .............................. 33/288

OTHER PUBLICATIONS

CV Products, *CV Laser Alignment Tool*, magazine advertisement, 1 page, undated.

* cited by examiner

*Primary Examiner*—G. Bradley Bennett
(74) *Attorney, Agent, or Firm*—Wood, Herron & Evans, L.L.P.

(57) ABSTRACT

A device for establishing a reference datum of a wheeled vehicle comprises a first element operably rotatably mounted to a hub of an axle of the vehicle, the first element having a first axis of rotation, a second element having one end rotatably mounted to the first element so as to have a second axis of rotation perpendicular to the first axis of rotation of the first element, and a laser mounted to the other end of the second element. The laser is oriented relative to the second element so as to project a laser plane either parallel to a longitudinal axis of the second element to thereby establish a vertical datum for the vehicle, or perpendicular to the longitudinal axis of the second element to thereby establish a horizontal datum for the vehicle.

9 Claims, 4 Drawing Sheets

14 24 80 82 84 60 66 50 68 72 54 70 74 62 40 52 90 46 78 42 92 76 102 100

14
40
12
18
40
10

METHOD OF AND MEANS FOR ESTABLISHING VEHICLE DATUM

Field Of The Invention

This invention relates generally to vehicles, and more particularly to high speed, precision vehicles of the type employed in the motor sports and gauging instruments therefor.

BACKGROUND OF THE INVENTION

Vehicles of the type utilized in motor sports, for example NASCAR races, are precision machines which require constant and precise gauging, adjustment, alignment and the like. Taking just the wheels of the vehicle as one example, the wheels are subject to rotational deviations about a horizontal axis and a vertical axis, and to linear deviations with respect to each other.

More particularly, the wheels of the vehicle may be subject to “toe-in/toe-out” which occurs when the wheels are pivoted about a vertical either clockwise or counterclockwise. Such a condition results in the front and rear edges of the wheel lying in a plane other than one which is perpendicular to a longitudinal axis of the axle to which the wheel is attached. The wheels may also be subject to a condition known as “camber.” This condition occurs when the wheels are pivoted about a horizontal axis either clockwise or counterclockwise. This condition results in the top and bottom edges of the wheel residing in a plane other than one which is perpendicular to the longitudinal axis of the axle to which the wheel is attached. Finally, the wheels may be subject to “offset” wherein the linear distances between the rear wheels and the front wheels differ, the linear distances between the left-hand wheels and the right-hand wheels differ, or either the front wheels or back wheels are shifted laterally relative to the other.

Contrary to what one would normally intuitively think, it is desirable in such a racing vehicle to have certain amounts of camber, toe-in/toe-out, and offset. In fact, all of these parameters can be fine tuned to a specific race track in order to optimize the performance of the racing vehicle for that track. However, before these parameters can be precisely fine tuned to maximize the vehicle’s performance on a particular track, one must be able to first accurately measure each of these parameters.

One rather crude method which has been utilized to take various measurements from the vehicle has been to utilize a number of individual lengths of string or twine attached to various points of the automobile, for example, axles, wheels, chassis, engine and the like. For a plumb bob effect a weight is secured to the bottom end of each of these strings. Then, various measurements may be taken from the strings to various points on the vehicle structure with, for example, a tape measure. As can be appreciated, such a method is rather tedious, time consuming and less than precise.

An improvement upon this prior technique has purportedly been devised by CD Products and is referred to as its “CD Laser Alignment Tool” in an advertisement in a trade publication. That ad states that this device is used to align a rear end housing under a race car. The ad illustrates a laser (understood by the applicant to be a “point” laser which projects a linear laser beam which appears as a dot on a surface in the path of the beam) attached to one end of an arm, with the other end of the arm being mounted to a wheel hub.

It would be desirable to improve upon the CD Products Laser Alignment Tool to better facilitate establishment of various vehicle datums from which to take various precision measurements in order to be able to fine tune various parameters of the vehicle to optimize the vehicle’s performance for a specific racing track.

SUMMARY OF THE INVENTION

The present invention is a device for establishing a reference datum of a wheeled vehicle. The apparatus comprises a first element operably rotatably mounted to a hub of an axle of the vehicle, the first element having a first axis of rotation, a second element having one end rotatably mounted to the first element so as to have a second axis of rotation perpendicular to the first axis of rotation of the first element, and a laser mounted to the other end of the second element. The laser is oriented relative to the second element so as to project a laser plane either parallel to a longitudinal axis of the second element to thereby establish a vertical datum for the vehicle, or perpendicular to the longitudinal axis of the second element to thereby establish a horizontal datum for the vehicle. Various distance measurements may then be made from these datums to various points on the vehicle structure.

As mentioned, the laser may be oriented such that it projects a plane either parallel or perpendicular to the longitudinal axis of the second element to thereby establish vertical or horizontal datums, respectively. Preferably however, the laser is utilized to selectively project both a plane parallel to, and a plane perpendicular to, the longitudinal axis of the second element to selectively establish vertical and horizontal datums, respectively, for the vehicle, so that both horizontal and vertical measurements can be made and recorded.

The first element is preferably a swing arm pivot comprising a block on one end and a clevis ear on the other end. The block has a pair of bores therethrough. The bores are perpendicular to one another and perpendicular to a longitudinal axis of the first element. The clevis ear has a bore therethrough parallel to one of the pair of bores in the block.

The second element is preferably a laser swing arm having a clevis on one end. The clevis has a bore therethrough and the clevis ear of the swing arm pivot is positioned in the clevis and secured with a pin passing through the clevis and the clevis ear bores. The other end of the laser swing arm has a block thereon with a bore therein perpendicular to the longitudinal axis of the laser swing arm. The laser is installed in this bore.

The device further preferably comprises a mounting adapter removably securable to the hub, a shaft extending from the adapter outwardly away from the hub, and a retaining collar slidably mounted on the shaft and selectively positionable therealong. The swing arm pivot is mounted on the shaft by sliding it thereon through one of its bores and is secured in place therealong with the retaining collar.

The device further preferably includes a pair of set screws installed in the swing arm block. The pair of set screws are perpendicular to one another and perpendicular to the laser bore in the block. The laser can thereby be selectively oriented by rotating the laser in the bore and fixed via the set screws so as to project a laser plane parallel to the longitudinal axis of the swing arm and perpendicular to the longitudinal axis of the swing arm to thereby selectively establish vertical and horizontal datums, respectively for the vehicle. The swing arm block may further preferably include a bore therein coaxial with the longitudinal axis of the swing arm. The bore is filled with lead for a plumb bob effect.

The major advantage of the present invention is reference planes of true vertical and true horizontal can be established for a vehicle such that accurate measurements may be taken on the vehicle in order to optimize the vehicle's performance.

These and other advantages of the present invention will become more readily apparent during the following detailed description taken in conjunction with the drawings herein, in which:

BRIEF DESCRIPTION OF THE DRAWINGS OF THE INVENTION

DETAILED DESCRIPTION OF THE INVENTION

Figure 1:
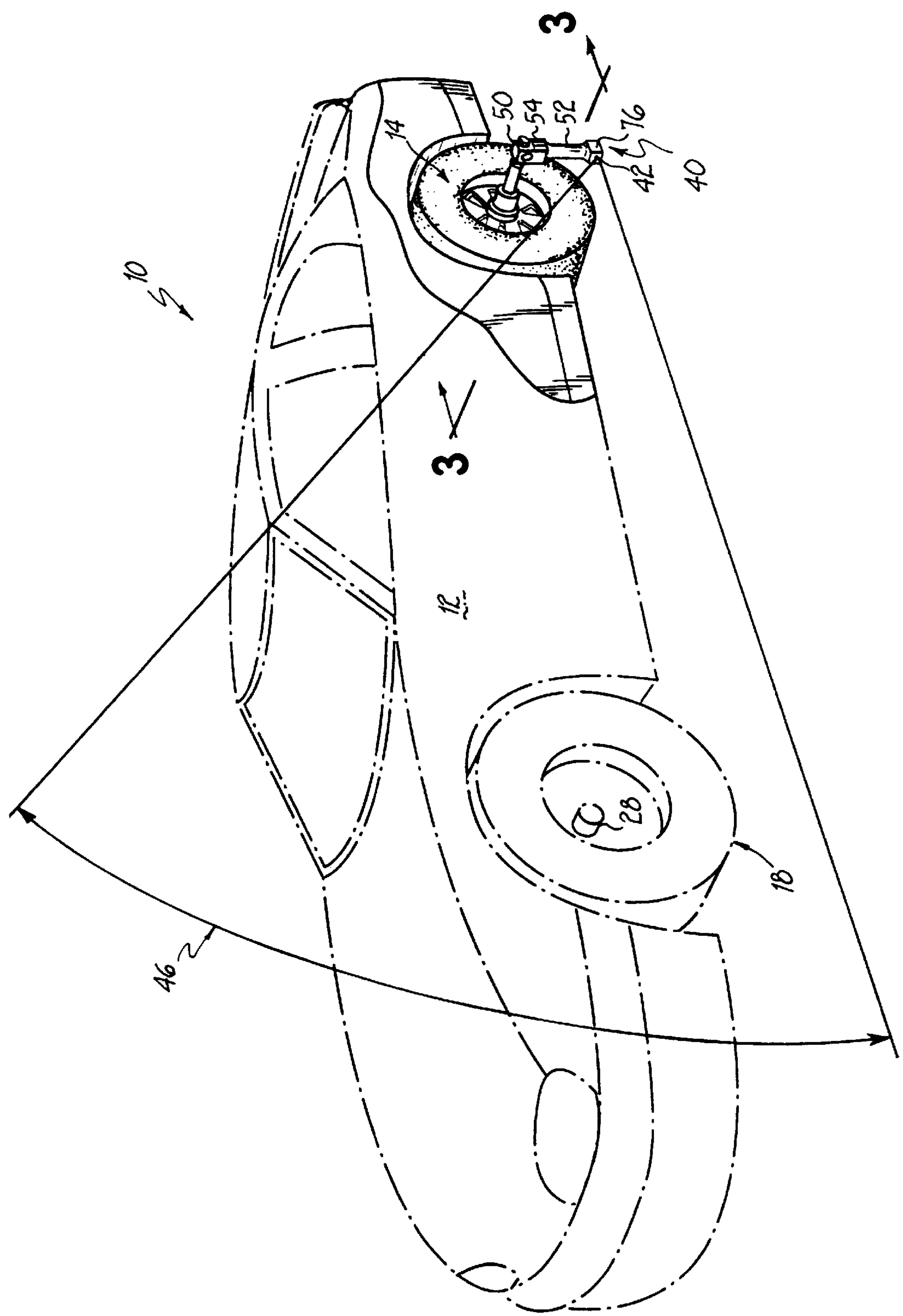
FIG. 1 is a perspective view of a vehicle including the device of the present invention mounted to the hub of the left rear wheel of a race car, the device projecting a vertical laser plane perpendicular to the hub.

Referring first to FIGS. 1–4, there is illustrated a racing vehicle 10, for example an automobile of the type which is raced on the NASCAR circuit. The car 10 includes a body 12, left rear wheel 14, right rear wheel 16, left front wheel 18 and right front wheel 20. Car 10 further includes corresponding left rear hub right rear hub 26, left front hub 28 and right front hub 30.

For purposes of taking various measurements from the vehicle 10, the right rear hub is presumed to be positioned true with respect to true horizontal and true vertical. In making such an assumption, it must be insured that the vehicle 10 is on a level surface, for example level shop floor or level hydraulic lift. Alternatively, and as will be described later, the device 40 can be oriented to guage the trueness or lack thereof of the right rear hub 26.

A device 40 of the present invention is first secured to the right rear hub 26. The laser 42 of the device 40 casts a planar laser beam 44 which, when viewed from the top, appears as a line. A like device 40 is mounted to the left rear hub 24. It likewise casts a planar laser beam 46 which, when viewed from the top as in FIG. 2, likewise appears as a line. The planar beams 44, 46, when viewed from perspective as is seen in FIG. 1, appear as a plane. When the beams 44, 46 are projected onto a surface in their paths, the beams appear as straight lines on the surface.

Figure 2:
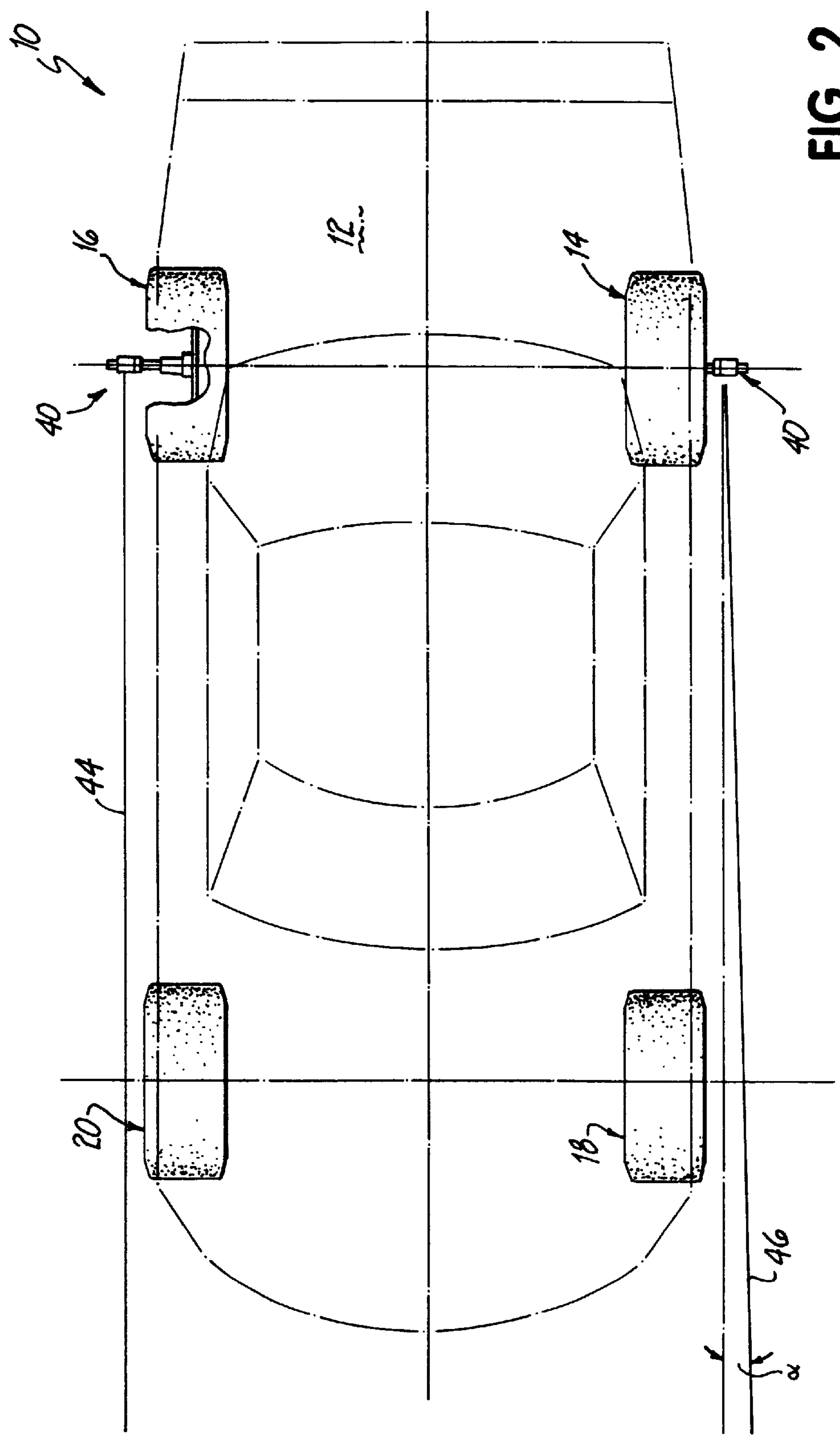
FIG. 2 is a top view of the car of FIG. 1 illustrating the device of the present invention mounted to both rear wheel hubs, the right rear hub being the datum and the left rear hub illustrating camber.
Figure 3:
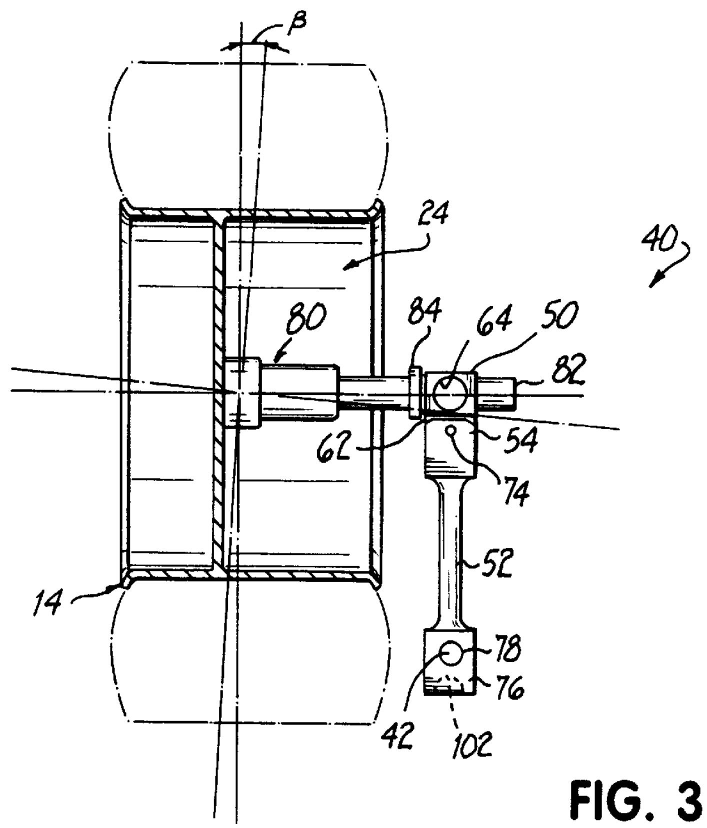
FIG. 3 is a view taken along line 3—3 of FIG. 1 and illustrating toe-in/toe-out.

Referring to FIGS. 1 and 2, it will be seen that the left rear hub 24 departs from parallel relative to the right rear hub 26 by an angle $\alpha$. The angle $\alpha$ represents the toe-in/toe-out of the left rear hub 24 and hence wheel. By removing the device 40 from the left rear hub 24 and placing it on the left front hub 28 and right front hub 30, the same measurement, i.e. of toe-in/toe-out, can be made for these wheels. Referring to FIG. 3, it will be seen that the left rear hub 24 departs from perpendicular relative to the right rear hub by an angle $\beta$. The angle $\beta$ represents the camber of the left rear hub 24 and hence wheel.

Figure 4:
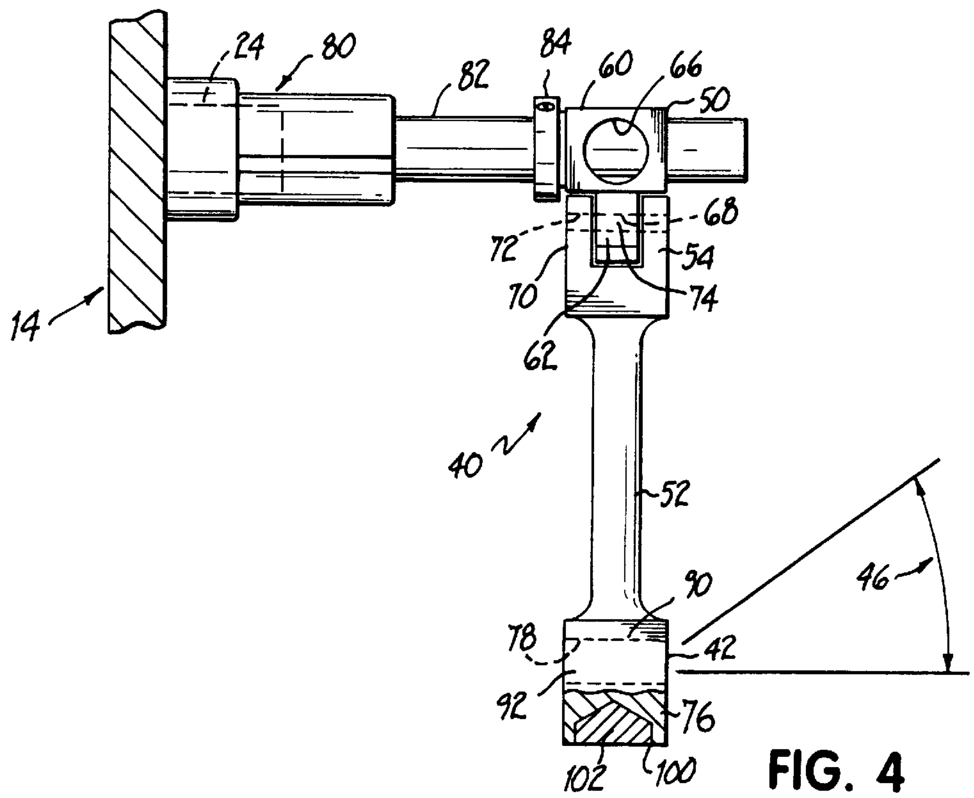
FIG. 4 is a view similar to FIG. 3 but with the device rotated 90° to project a vertical laser plane parallel to the hub.
Figure 5:
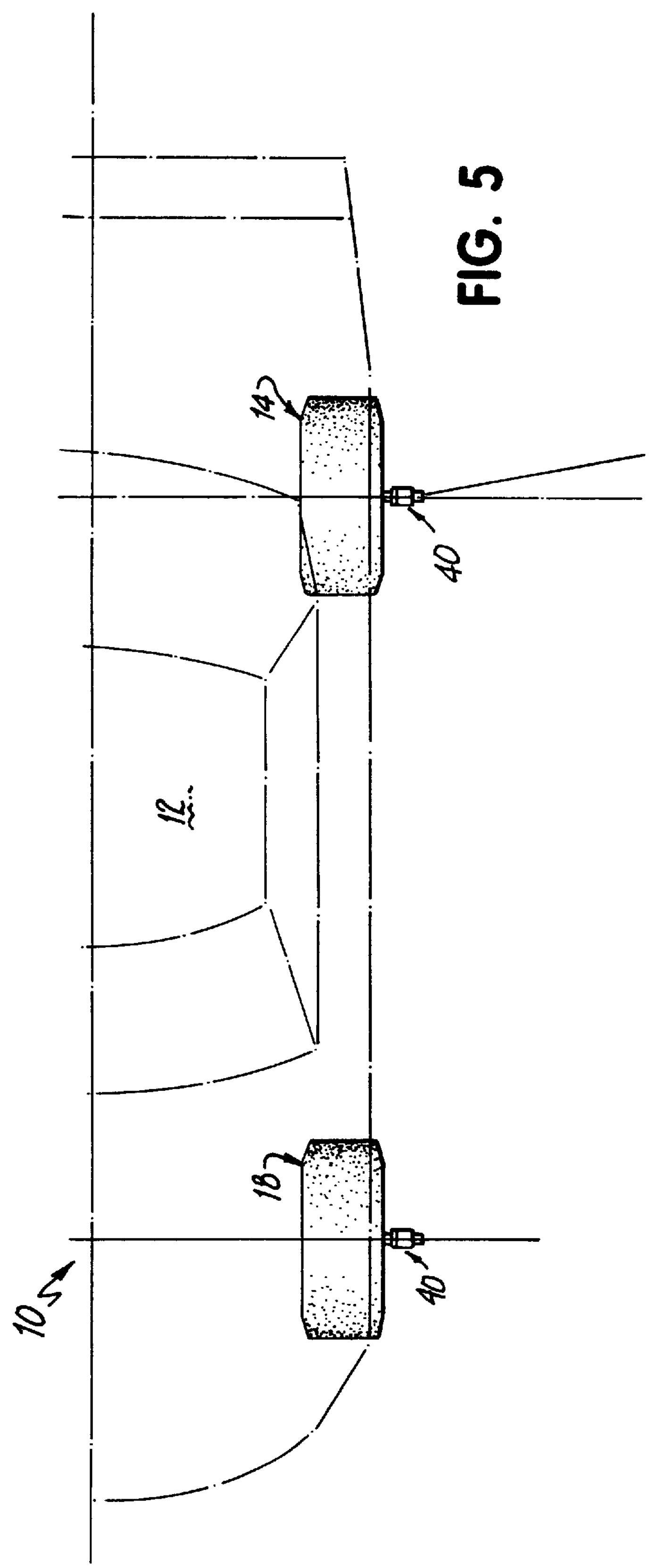
FIG. 5 is a view similar to FIG. 2 but with the device of the present invention oriented as in FIG. 4, and mounted to both left-hand wheel hubs.

Referring now specifically to FIGS. 3–5, the device 40 of the present invention is shown in more detail. There it will be seen that, in a preferred embodiment, the device 40 includes a first element 50 operably rotatably mounted to the hub 24 of an axle of the vehicle 10. The first element 50 has a first axis of rotation which is about the axis of the hub 24, i.e. is horizontal. A second element 52 has one end 54 rotatably mounted to the first element 50 so as to have a second axis of rotation which is perpendicular to the first axis of rotation of the first element 50. That is to say the axis of rotation of the second element 52 is also horizontal yet is perpendicular to the axis of rotation of the first element 50. The prior mentioned laser 42 is mounted to the other end of the second element 52. The laser 42 may be selectively oriented relative to the second element 52 so as to project a laser plane parallel to the longitudinal axis of the second element 52 to thereby establish a vertical datum for the vehicle, and perpendicular to the longitudinal axis of the second element 52 to thereby establish a horizontal datum for the vehicle, as will be described in more detail below.

More particularly, the first element 50 is a "laser swing arm pivot" comprising a block 60 on one end and a clevis ear 62 on the other end. The block 60 includes a pair of bores 64, 66 therethrough. The bores 64, 66 are perpendicular to one another and perpendicular to the longitudinal axis of the swing arm pivot 50. The clevis ear 62 has a bore 68 therethrough parallel to the bore 64 in the block 60.

The second element 52 is a "laser swing arm" having a clevis 70 on one end. The clevis 70 has a bore 72 therethrough. The clevis ear 62 of the swing arm pivot 50 is positioned in the clevis 70 and is secured with a pin 74 passing through the clevis and clevis ear bores 72, 68. The other end of the swing arm has a block 76 thereon with a bore 78 therein perpendicular to the longitudinal axis of the swing arm 52. The above-mentioned laser 42 is installed in the bore 78.

In order to mount the device 40 to the hub of a vehicle wheel, a mounting adaptor 80 is provided. The mounting adaptor 80 is removably securable to the vehicle hub. A shaft 82 extends from the adaptor 80 outwardly away from the hub 24. Adaptor 80 and shaft 82 are, collectively, the "laser swing arm mount." A retaining collar 84 is slidably mounted on the shaft 82 and is selectively positionable therealong. The block 60 of the swing arm pivot 50 is mounted on the shaft 82 and is secured in place a known distance from a reference such as the hub edge or centerline of the wheel, etc. By virtue of the two perpendicular bores 64, 66 in block 60, the swing arm pivot 50, swing arm 52 and hence laser 42 can be selectively oriented so that the laser 42 projects a laser plane either perpendicular to the axis of the hub or parallel thereto.

A pair of set screws 90, 92 are installed in the swing arm block 76. The pair of set screws 90, 92 are perpendicular to one another and perpendicular to the laser bore 78 in the block 76. Thus, the laser 42 can be selectively oriented by rotating the laser 42 in the bore 78 so as to project a laser plane parallel to the longitudinal axis of the swing arm 52 (i.e. vertical) and to project a laser plane perpendicular to the longitudinal axis of the swing arm 52 (i.e. horizontal) and fixed thereat to thereby selectively establish vertical and horizontal datums, respectively for the vehicle.

To aid the combination swing arm pivot and swing arm in arriving at a true vertical position, a counterbore 100 is bored into the lower end of the block 76 of the swing arm 52. The bore 100 is filled with, for example, lead 102 to achieve a plumb bob effect. As a double check to insure that the beam projected from the laser is in fact truly vertical (or horizontal depending on the orientation of laser 42 in bore 78) a simple 4-font carpenter's level can be placed into the path of the planar laser beam; if the laser line projected with the level is truly vertical (or horizontal) by the level then one is absolutely sure the device 40 is hanging correctly.

The swing arm pivot 50, swing arm 52, mounting adaptor 80, shaft 82 and retaining collar 84 are all preferably fabricated of aluminum, e.g. 6061 T6. The laser 42 is preferably of the type denoted as model UM670-5-G (which indicates 670 nm, 10 mw, line), manufactured by Unice E-O and available from Jameco as part number 143845. The included angle of the laser plane projected from the laser 42 is 60° . One or more bearings may be incorporated into the device 40 as well to promote free rotation of the swing arm pivot and swing arm.

In use, and as briefly mentioned above, the right rear hub 26 can be assumed to be true and then outfitted with a device 40 for establishing reference for baseline datums. Alternatively, the right rear hub 26 can be gauged by the device 40 to insure that the rear axle is in fact straight and is positioned true horizontal. To do this, the device 40 is oriented as in FIGS. 4 and 5 so as to project a laser plane along the length of the axle. Measurements can be taken along the axle back to the laser plane, the results of which will indicate whether the axle is straight. Next, the laser itself 42 can be rotated 90° by virtue of the set screws 90, 92 so that it now projects a horizontal planar beam. Again, measurements can be taken from the axle to the planar beam to insure that the axle is in fact true horizontal. Then, measurements may be taken as desired.

For example, referring back to FIGS. 1 and 2, a like device 40 can be positioned on the left rear hub, left front hub and right front hub to determine toe-in/toe-out of all of these hubs. The linear distance between the two laser planes 44, 46 is simply measured at a point along the longitudinal length of the vehicle 10 and the toe-in/toe-out angle is computed.

Next, the device 40 is rotated 90° by virtue of the bores 64, 66 to be configured as is shown in FIGS. 3 and 4. Placing the device 40 as configured in these Figures at each of these left rear, left front and right front hubs enables camber measurements to be taken by measuring the distance between the two laser planes projected by the two devices and computing the camber angle.

Many other measurements may be taken as well. For example, measurements between the hubs and the engine, hubs and the chassis, etc. can be measured and recorded. In so doing the wheel alignment, body alignment, chassis alignment and engine alignment, along and across the vehicle, as well as height-wise of the vehicle, can all be recorded. Once the various parameters are dialed in for a specific racing track to optimize the vehicle's performance for that track, targets can be fabricated to allow one to quickly check these various measurements to insure that there have been no deviations from the dialed-in optimum parameters. Such targets can be removably attached at known points along the vehicle's frame etc. In fact, it is important that the "rear end" of the vehicle be square relative to the frame or chassis of the car so that the resulting camber, toe-in/toe-out and offset measurements are relative to the frame or chassis. The invention as described allows this measurement to be performed to confirm that the rear end of the vehicle is in fact square with the frame/chassis.

Those skilled in the art will readily recognize numerous adaptations and modifications which can be made to the present invention which will result in an improved method of and means for establishing a vehicle datum, yet all of which will fall within the spirit and scope of the present invention as defined in the following claims. For example, the swing arm 52 could be fabricated as a single piece, or two pieces; for example the block 76 could be fabricated separately from the balance of the swing arm 52 and attached thereto with fasteners. Accordingly, the invention is to be limited only by the scope of the following claims and their equivalents.

What is claimed is:

1. A device for establishing a reference datum of a wheeled vehicle, said apparatus comprising:

a first element adapted to be operably rotatably mounted to a hub of an axle of the vehicle, said first element having a first axis of rotation;

a second element having one end rotatably mounted to said first element so as to have a second axis of rotation perpendicular to said first axis of rotation of said first element; and a laser mounted to the other end of said second element, said laser being oriented relative to said second element so as to project a laser plane at least one of: i) parallel to a longitudinal axis of said second element to thereby establish a vertical datum for the vehicle, and ii) perpendicular to the longitudinal axis of said second element to thereby establish a horizontal datum for the vehicle.

2. The device of claim 1 wherein said laser only projects a laser plane parallel to the longitudinal axis of the second element to thereby establish a vertical datum for the vehicle.

3. The device of claim 1 wherein said laser only projects a laser plane perpendicular to the longitudinal axis of the second element to thereby establish a horizontal datum for the vehicle.

4. The device of claim 1 wherein said laser selectively projects a laser plane parallel to the longitudinal axis of the second element and perpendicular to the longitudinal axis of the second element to thereby selectively establish vertical and horizontal datums for the vehicle, respectively.

5. The device of claim 1 wherein said first element is a swing arm pivot comprising a block on one end and a clevis ear on the other end, said block having a pair of bores therethrough, said bores being perpendicular to one another and perpendicular to a longitudinal axis of said first element, said clevis ear having a bore therethrough parallel to one of said pair of bores in said block.

6. The device of claim 5 wherein said second element is a laser swing arm having a clevis on one end, said clevis having a bore therethrough, said clevis ear of said swing arm pivot positioned in said clevis and secured with a pin passing through said clevis and clevis ear bores, the other end of said laser swing arm having a block thereon with a bore therein perpendicular to the longitudinal axis of the laser swing arm, said laser installed in said bore.

7. The device of claim 6 further comprising:

a mounting adapter removably securable to the hub;

a shaft extending from said adapter outwardly away from said hub; and a retaining collar slidably mounted on said shaft and selectively positionable therealong;

said swing arm pivot mounted on said shaft via one of said bores of said swing arm and secured in place therealong with said retaining collar.

8. The device of claim 6 further including a pair of set screws installed in said swing arm block, said pair of set screws being perpendicular to one another and perpendicular to said laser bore in said block, whereby said laser can be selectively oriented by rotating said laser in said bore so to as to project a laser plane parallel to a longitudinal axis of said swing arm and perpendicular to a longitudinal axis of the swing arm to thereby selectively establish vertical and horizontal datums, respectively for the vehicle.

9. The device of claim 6 wherein said swing arm block includes a bore therein coaxial with the longitudinal axis of said swing arm, said bore being filled with lead for a plumb bob effect.

* * * * *

UNITED STATES PATENT AND TRADEMARK OFFICE

CERTIFICATE OF CORRECTION

PATENT NO. : 6,226,879 B1
DATED : May 8, 2001
INVENTOR(S) : Billy Carr Baird

It is certified that error appears in the above-identified patent and that said Letters Patent is hereby corrected as shown below:

Column 1,
Line 20, substitute "about a vertical either" with -- about a vertical axis either --.

Column 3,
Line 37, substitute "left rear hub right rear hub 26, left from" with -- left rear hub 24, right rear hub 26, left front --.
Line 45, substitute "guage" with -- gauge --.

Column 7,
Lines 2 and 3, substitute "said bore so to as to project a laser" with -- said bore so as to project a laser --.

Signed and Sealed this

Twenty-second Day of March, 2005

JON W. DUDAS
*Director of the United States Patent and Trademark Office*